United States Patent [19]
Taub

[11] 3,816,360
[45] June 11, 1974

[54] TRIETHANOLAMINE METHYLENEDIANILINE CURING AGENT AND THE PROCESS FOR USING SAME IN THE MANUFACTURE OF HIGH RESILIENT COLD MOLDED FOAM

[75] Inventor: Bernard Taub, Williamsville, N.Y.
[73] Assignee: Allied Chemical Corporation, New York, N.Y.
[22] Filed: Dec. 11, 1972
[21] Appl. No.: 314,048

[52] U.S. Cl...... 260/2.5 AM, 252/182, 260/2.5 BD, 260/77.5 AM, 260/77.5 AQ
[51] Int. Cl... C08g 22/44, C08g 22/08, C08g 22/02
[58] Field of Search 260/2.5 AM, 2.5 AZ, 77.5 AM, 260/77.5 AQ, 2.5 BD, 2.5 BC

[56] References Cited
UNITED STATES PATENTS

| | | | |
|---|---|---|---|
| 3,459,671 | 8/1969 | Marklow | 260/77.5 AQ |
| 3,496,229 | 2/1970 | Powers | 260/77.5 AM |
| 3,575,896 | 4/1971 | Khan | 260/2.5 AM |
| 3,580,869 | 5/1971 | Rhodes | 260/2.5 AM |
| 3,583,926 | 6/1971 | Zwolinski | 260/2.5 AM |
| 3,598,748 | 8/1971 | Hirosawa | 260/2.5 AM |
| 3,641,151 | 2/1972 | Kokorudz | 260/77.5 AM |
| 3,725,354 | 4/1973 | Sundholm | 260/77.5 AM |

FOREIGN PATENTS OR APPLICATIONS

| | | | |
|---|---|---|---|
| 1,142,667 | 2/1969 | Great Britain | 260/2.5 AZ |

Primary Examiner—Donald E. Czaja
Assistant Examiner—C. Warren Ivy
Attorney, Agent, or Firm—Jay P. Friedenson; Michael L. Dunn

[57] ABSTRACT

A novel curing agent and method for using same. The curing agent comprises from about 60 to about 70 weight percent triethanolamine, from about 20 to about 35 weight percent of a selected aromatic diamine and from about 5 to about 20 weight percent of a mixture of at least two aromatic polyamine compounds, each having the general formula:

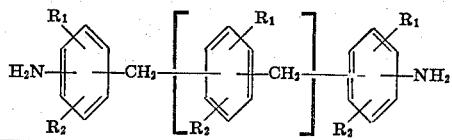

wherein $R_1$ and $R_2$ are independently at each occurrence H, halogen, lower alkyl or amine, $x$ is 0 or an integer of 1 to 15 provided that if one of the compounds in said mixture is the selected aromatic diamine then said mixture comprises at least 40 percent by weight of two compounds having the above general formula other than said selected aromatic diamine. The process comprises using the novel curing agent in the manufacture of polyurethane foam.

6 Claims, No Drawings

TRIETHANOLAMINE METHYLENEDIANILINE CURING AGENT AND THE PROCESS FOR USING SAME IN THE MANUFACTURE OF HIGH RESILIENT COLD MOLDED FOAM

BACKGROUND OF THE INVENTION

In the early years of molded flexible polyurethane foam development, a prepolymer or two-shot molding process was employed. This prepolymer process was objectionable for various reasons, including poor reproducibility or prepolymer quality, metering and mixing difficulties as a result of the viscous nature of the prepolymer and the water amine catalyst solution, instability in the pre-gel stage, and unduly long post-cure of the foam. With the introduction of organo-tin and amine catalysts and silicone surfactants, one-shot foam molding became possible. Hence, one-shot molded polyurethane foams conventionally may be prepared by admixing polyols and aromatic polyisocyanates, usually in the presence of a catalyst and a blowing agent. Curing of foams produced in such manner, however, requires that the mold employed be quickly heated to high temperatures, i.e., in excess of 300°F. by any suitable means, such as gas ovens or microwave or infrared heating, after charging the mold with the foamable reaction mixture and maintaining the mold content at said temperature for a period in excess of at least 10 minutes to ensure sufficient cure of the foam to permit removal thereof from the mold.

More recently, there has been developed a new type of molded polyurethane foam suitable for use in cushions, as insulation, as matresses and in other applications in which prior art polyurethane foams were used. The new type of foam can be processed at much lower temperatures through the use of new highly reactive high molecular weight polyols. In general, polyols used for conventional hot molding contained at most a 50/50 ratio of primary to secondary hydroxyl content, while highly reactive polyols used in cold molded high resiliency foams can have as high as an 85/15 ratio of primary to secondary hydroxyl groups. Terms such as "cold molding," "cold cure" and "high resilient" foam have been used in connection with such foam products. Such foam products not only exhibit desirable properties, such as a latex-like feel, high sag factor and improved fire retardancy, but the production thereof requires lower processing temperatures and shorter cure cycles.

In conjunction with the preparation of this new class of "cold molded" polyurethane foams, a variety of stiffening or cross-linking curing agents have been used to increase the load bearing properties of the foam. Although both polyols and polyamines have been proposed for use in this application, only aromatic diamines have met with some success. Methylene-bis(o-chloroaniline), known in the art as MOCA, can be used; however, this material is a solid at room temperature and must be melted and kept molten while being utilized in the polyurethane foam manufacturing process. Similarly, other materials used in conjunction with the highly reactive polyols in the cold molding foam process are either highly viscous or solid at room temperature and must be heated prior to use. Other such materials are originally liquid at room temperature but separate at shipping temperatures commonly encountered in North America which can easily reach −10°F., and can be as low as −30°F. Products, such as methylene-dianiline, are of particular interest for use as compounds which will react with the new reactive polyols since they are low in cost and readily available; however, they could be used only with difficulty because they are solid at room temperature and because of rapid reactivity which causes the formation of a gel prior to foaming.

Other materials which have been proposed as curing agents for polyurethane foams have a disadvantage in that they are incompatible with polyols commonly encountered in the manufacture of polyurethane foams.

It is therefore an object of this invention to provide an amine curing agent which is liquid at room temperature and is of relatively low viscosity.

Another object of the present invention is to provide a liquid amine curing agent which does not deposit solids on prolonged storage even at low temperatures.

Another object of this invention is to provide a curing agent which contains methylenedianiline.

Still another object of this invention is to provide a curing agent which is compatible with polyols used in manufacture of polyurethane foams.

BRIEF DESCRIPTION OF THE INVENTION

It has now been found that these and other objectives are accomplished when an amine curing agent for polyurethane foam is used, which curing agent comprises a selected aromatic diamine, sufficient triethanolamine to prevent gel formation in the polyurethane before foaming of the polyurethane is complete and a sufficient amount of an aromatic polyamine mixture to keep the curing agent in a liquid phase at temperatures at least as low as −10°C for a time period of at least 3 months. The aromatic polyamine mixture comprises a mixture of at least two aromatic polyamines other than the selected aromatic diamine. As used herein "aromatic polyamine" means a polyamine having two or more amine groups each attached to a different carbon atom of the same or different aromatic ring. The amine curing agent may comprise and may consist essentially of from about 60 to about 70 weight percent triethanolamine, from about 20 to about 35 weight percent of a first selected aromatic diamine and from about 5 to about 20 weight percent of a mixture of at least two aromatic polyamine compounds. As used herein "aromatic diamine" means a diamine wherein each amine group is attached to a different carbon atom of the same or different hydrocarbon aromatic ring. The aromatic ring may contain other substituents, such as the halogens, fluorine, bromine and particularly chlorine, or lower alkyl of 1 to 8 carbons. Examples of such aromatic diamines are toluenediamine, naphthalenediamine, phenylenediamine and methylenedianiline. The mixture of aromatic polyamine compounds comprises from about 5 to about 20 weight percent of a mixture of at least two such aromatic polyamine compounds, each of which may have the general formula:

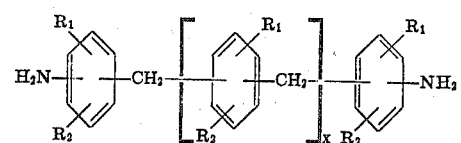

wherein $R_1$ is independently at each occurrence in each compound H, halogen, lower alkyl of 1 to 8 carbon atoms, or amino; $R_2$ is independently at each occurrence in each compound H, halogen, lower alkyl or amino; and $x$ is 0 or an integer of 1 to 15 provided that if one of said compounds in said mixture is the selected aromatic diamine then said mixture comprises at least 40 percent by weight of two compounds having the above general formula other than the above selected aromatic diamine. It has been found that aromatic diamines dissolve readily in triethanolamine, however, after only about 24 hours at room temperature the aromatic diamine crystallizes out of solution. It has been discovered that when from about 5 to about 20 weight percent of a mixture of at least two aromatic polyamines, other than the first selected aromatic diamine, which aromatic polyamines may have the general formula:

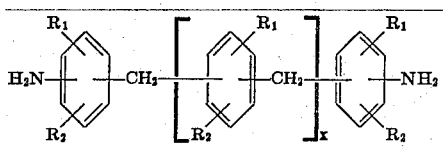

not more than 60 percent of which is the selected aromatic diamine wherein $R_1$, $R_2$ and x are as defined above, is added to the aromatic diamine triethanolamine mixture, the composition remains stable at room temperature and crystallization does not occur even after storage for an extended period at low temperatures. "Extended period" means a time period of at least 3 months and "low temperatures" means at least $-10°C$.

DETAILED DESCRIPTION OF THE INVENTION

In the practice of the invention the preferred novel amine curing agent is made by blending from about 60 – 70 weight percent of triethanolamine with from about 20 to about 35 weight percent of 4,4'-methylenedianiline and with from about 5 to about 20 percent of a mixture of at least two compounds each having the general formula:

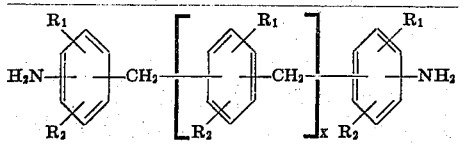

wherein $R_1$ is independently at each occurrence H, halogen, lower alkyl or amino; $R_2$ is independently at each occurrence H, halogen, lower alkyl or amino; and $x$ is 0 or an integer of from 1 to 15 provided that if one of the two compounds in the mixture is methylenedianiline then the mixture comprises at least 40 percent by weight of two compounds other than methylenedianiline having the above general formula. The preferred amine curing agent consists essentially of from about 60 to about 70 weight percent of triethanolamine, about 25 to 35 weight percent of 4,4'-methylenedianiline and from about 5 to about 10 weight percent of the previously defined mixture.

The compounds in the previously defined mixture preferably correspond to the foregoing general formula wherein $R_1$ is H and $R_2$ is H or Cl. In a first embodiment of the invention where the previously defined mixture is crude methylenedianiline, the mixture contains about 35 to about 50 percent by weight of:

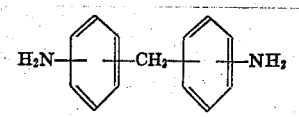

The mixture in said embodiment of the invention may further contain from about 15 to 25 percent by weight of:

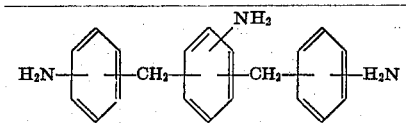

about 10 to 20 percent by weight of:

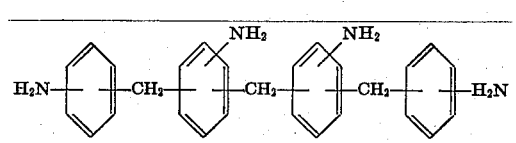

and the balance being:

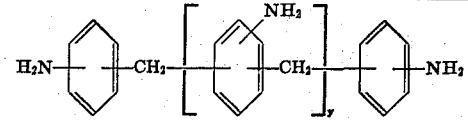

where $y$ is 3 to 15.

All of the above formulas are intended to include one or more isomers. When the curing agent mixture is blended with polyol, water, surfactant and catalyst and then reacted with isocyanate, there is formed a high resilient urethane foam. This curing agent can be used with either pure toluene di-isocyanate or with crude toluene di-isocyanates. The curing agent can be used to make cold molded high-resilient foam or free rise slab stock high resilient foam. The curing agent may additionally be used in manufacturing elastomeric polyurethanes or rigid polyurethane foams.

In a second embodiment of the invention wherein the previously defined mixture is crude methylenedichloroaniline including about 35 to about 50 percent by weight of:

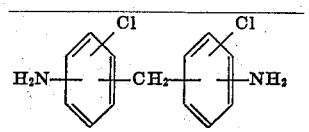

the balance being:

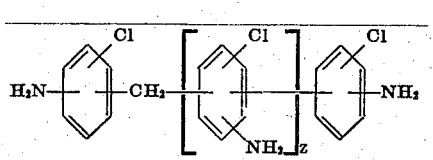

where $z$ is 1 to 15.

The mixture of at least two compounds each having the general formula:

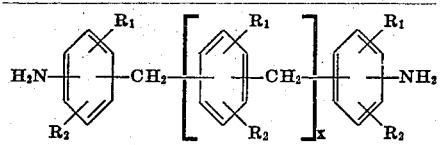

is generally prepared by reaction 1 as follows:

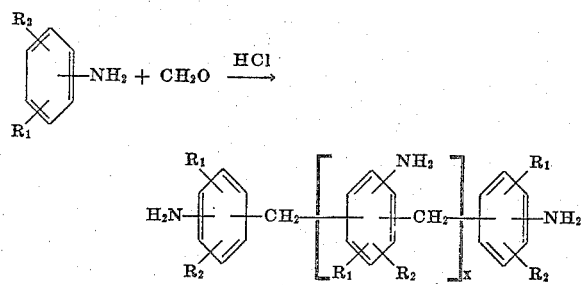

wherein $R_1$, $R_2$ and $x$ are as previously defined. For example, the reaction of phenylamine with formaldehyde in the presence of hydrochloric acid yields a mixture of products having the general formula:

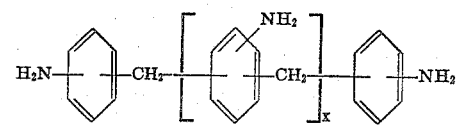

wherein $x$ is as previously defined.

The curing agent of the invention can be used with any of a wide variety of crude or pure organic polyisocyanates or mixtures thereof which are commonly employed in the preparation of polyurethane foams. Typical of such suitable polyisocyanates are m-phenylene diisocyanate; 2,4-toluenediisocyanate; 2,6-toluenediisocyanate; naphthalene-1,5-diisocyanate; 4,4'-methylenebis-(phenylisocyanate); 1,3,5-benzenetriisocyanate; and polyarylpolyalkylene polyisocyanates such as a polymethylenepolyphenylisocyanate. Isocyanates prepared by the phosgenation of the reaction product between aniline and formaldehyde having a functionality of 2.2 or greater, generally, 2.2 to about 3.5 are described in U.S. Pat. Nos. 2,683,730 and 3,362,979.

The preferred isocyanate component used in the present invention, however, comprises an undistilled toluenediamine phosgenation reaction product or a modified product thereof having a minor amount of a difunctional active hydrogen containing compound incorporated therein, said products having an amine equivalent within the range of about 90 to 125. By "undistilled toluenediamine phosgenation reaction product" is meant the reaction product of a mixture of essentially 2,4- and 2,6-toluenediamines with phosgene from which product essentially all of the reaction solvent, if present during the phosgenation reaction, has been removed by distillation and from which none or up to a major portion of the toluene diisocyanate has been removed by distillation. Such products may contain up to 90 percent by weight of volatile aromatic polyisocyanate, i.e., aromatic polyisocyanate separable from the composition by distillation. Undistilled toluenediamine phosgenation reaction products of this class and modified products thereof are described in U.S. Pat. Nos. 3,316,286 and 3,341,462, respectively; the disclosures of which are incorporated herein by reference. If desired, the undistilled toluenediamine phosgenation products can be diluted with up to about 85 percent by weight of distilled toluene diisocyanate or a mixture of the isomeric 2,4- and 2,6-toluene diisocyanates. A small amount of polyol may be added to the diisocyanate to modify reactivity.

The polyol component required to be used in the process of the present invention is a polyalkylene ether tetrol, triol or diol or mixtures thereof, having a number average molecular weight between about 3,000 and 7,500, preferably between about 4,500 to 6,700 and generally having a hydroxyl number between about 25 and 100. Polyether polyols of this type are conventionally obtained by reaction of an alkylene oxide, for example, ethylene oxide, propylene oxide, butylene oxide, trimethylene oxide or a mixture of two or more thereof, with a polyhydric alcohol such as ethylene glycol, propylene glycol, dipropylene glycol, glycerol, tetramethylene glycol, trimethylolpropane or mixtures thereof. The preferred polyol is a polyalkylene ether triol so that a strong flexible high resilient foam will be obtained.

Polyether polyols derived from 1,2-propylene oxide and mixtures of 1,2-propylene oxide with ethylene oxide contain a major proportion of secondary hydroxyl groups and only a minor proportion of the more reactive primary hydroxyl groups. The reactivity of the polyol can be enhanced by reacting such polyols containing essentially secondary hydroxyl groups with ethylene oxide, or 1,3-propylene oxide and thereby obtain a polyether polyol having an increased proportion of primary hydroxyl groups. Such polyols are known in this art as "capped" or "tipped" polyether polyols and are particularly suited for use in the process of the present invention.

The novel flexible urethane structures of the present invention are prepared in the presence of a blowing agent which preferably comprises water, which by in situ reaction with the isocyanate component produces carbon dioxide. This carbon dioxide gas assists in the foaming step producing the cellular structure. This reaction also results in urea linkages which contributes crosslinking sites and thus gives strength and load bearing properties to the urethane polymer. If desired, another blowing agent, for example, methylene chloride, fluorocarbons and the like, may be used in place of or in addition to water, primarily to provide lower density structures and a softer urethane product.

The amount of water can be varied within the range of about 1 to 10 percent, based on the weight of the polyether polyol. The auxiliary or substitute blowing agent, if employed, can be likewise present in an amount of up to about 10 percent by weight based on the weight of the polyol. The amount(s) of blowing agent(s) used will depend upon the characteristics, density, load bearing, etc., desired in the flexible structure being prepared.

The amount of the polyurethane foaming components used follows conventional practice in the preparation of such flexible cellular structures. In general, the amount of the polyisocyanate component used is sufficient to provide from about 0.9 to 1.2 isocyanate groups for each hydroxyl group present in the polyols and the water added to provide blowing agent (generally referred to as NCO:OH index). Preferably the amount is such as to provide a slight excess, e.g., a NCO:OH index of about 1.01 to 1.10.

In accordance with conventional practice in the cellular polyurethane art, various reaction promotors in the form of catalysts or accelerators may be employed in the foam-forming reaction. Examples of compounds for use as accelerators or catalysts in polyurethane foam formation include conventional tertiary amine catalysts, such as triethylamine, N-methylmorpholine, N-ethylmorpholine, triethylenediamine, N,N,N',N'-tetramethyl-1,3-butanediamine and trimethylaminoethylpiperazine, and catalysts comprising a mixture of such an amine with a tertiary amine salt of an alkylarylsulfonic acid, containing from about 9 to about 15 carbon atoms in the alkyl chain as is disclosed in Canadian Pat. No. 857,851, issued Dec. 1, 1970, the disclosure of which is incorporated herein by reference. These catalysts and/or accelerators may be used alone or mixtures thereof may be utilized to prepare the cellular polyurethanes of the present invention.

In further accordance with conventional practice in cellular polyurethane foam production, other materials which may conventionally be employed in the production of polyurethane foams according to the present invention include stabilizers, particularly organosilicones commercially available for this purpose, fillers, flame retardants and pigments.

The process of the invention for manufacturing comprises blending the curing agent of the invention, a blowing agent, a catalyst, and polyisocyanate into a polyol and heating the resulting blend to from about 110°F. to about 300°F. and preferably to from about 130° to 200°F. until a cured polyurethane foam is formed.

As previously discussed the polyol is selected from a polyalkylene ether tetrol, polyalkylene ether triol, polyalkylene ether diol or mixtures thereof wherein the polyol has an average hydroxyl number between about 25 and 100.

From about 2 to about 10 percent and preferably from about 3 to 6 percent of the curing agent of the invention by weight of polyol is used, having the composition comprising and preferably consisting essentially of from about 60 to about 70 weight percent triethanolamine, from about 20 to about 35 weight percent of a mixture of at least two compounds each having the general formula:

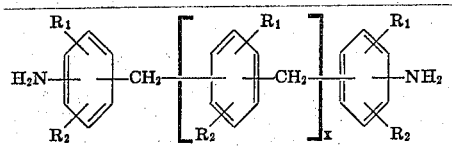

wherein $R_1$ is independently at each occurrence in each compound H, halogen, lower alkyl or amino; $R_2$ is indepently at each occurrence in each compound H, halogen, lower alkyl or amino; and $x$ is 0 or an integer of 1 to 15 provided that if one of said compounds in said mixture is said aromatic diamine then said mixture comprises at least 40 percent by weight of two compounds other than said aromatic diamine having the above general formula is blended into the polyol.

From about 1 to about 10 percent and preferably from about 2 to about 5 percent of a blowing agent based on the weight of polyol is used. Water is preferably used as the blowing agent. From about 0.4 percent to about 2.5 percent, and preferably from about 0.6 percent to about 1.5 percent of a promotor, based on weight of the polyol, which is preferably a tertiary amine catalyst, is used as previously discussed.

Sufficient polyisocyanate is used to provide from about 0.9 to 1.2 isocyanate groups for each hydroxyl group present in the polyol and in the water.

The blend is preferably mixed with an agitator operating at a speed of from about 1,700 to about 5,000 rpm. and more preferably at a speed between 2,000 and 3,500 rpm.

After the foam is formed, it is preferably crushed by a press; the press is then raised and the foam is released. The foam is then allowed to cure for at least 24 hours.

The novel polyurethane foams prepared according to the process of the present invention are characterized by having a tensile strength of at least 12 psi, an elongation of at least 100 percent, a tear strength of at least 1.5 lbs./in., a sag factor of above about 2.5, which properties evidence high quality foams suitable for use in applications in which prior art polyurethane foams were used.

To further illustrate the present invention and the manner in which it may be practiced, the following specific examples are set forth. In the examples, unless otherwise indicated, all parts and percentages are by weight, and the foams were evaluated by art recognized procedures as set forth in ASTM-1564.

EXAMPLE 1

Preparation of Curing Agent

A mixture of 525 parts of triethanolamine, 238 parts of methylenedianiline and 63 parts of crude methylenedianiline (functionality 2.6, equivalent weight 104) found by infrared and elemental analysis to have about 45 percent methylene dianiline, about 22 percent of various isomers of

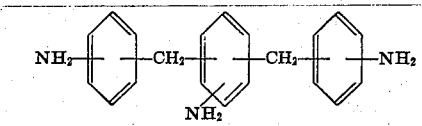

and the balance being

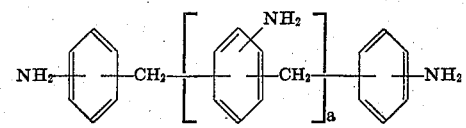

wherein $a$ is an integer of 2–10, was heated and mixed at 110°C. until the mixture became homogeneous. At room temperature (25°C.), the resulting solution is a reddish-brown liquid. The reddish-brown solution was stable for at least six months at temperatures as low as −30°C. with no deposition of solids. Viscosity-temperature characteristics are:

| | |
|---|---|
| 25°C. | 1800 cps |
| 38°C. | 445 cps |
| 49°C. | 190 cps |
| 71°C. | 52 cps |

EXAMPLE 2

Comparison of Mixtures of Triethanolamine, Methylene Dianiline and Crude Methylene Dianiline Summarized in Table I are data on the stability of various mixtures of triethanolamine (TEOA), methylene dianiline (MDA) and crude polymeric methylene dianiline (CRUDE MDA).

TABLE I

| COMPOSITION | MIXTURES OF TEOA/MDA/CRUDE MDA | | | |
|---|---|---|---|---|
| | 1 | 2 | 3 | 4 |
| Triethanolamine, parts | 525 | 525 | 400 | 400 |
| Weight % | (64) | (64) | (57) | (57) |
| Methylenedianiline, parts | 238 | 268 | 238 | 268 |
| Weight % | (29) | (32) | (34) | (38) |
| Crude Methylenedianiline, parts | 63 | 31 | 63 | 31 |
| Weight % | (7) | (4) | (9) | (5) |
| Equivalent Weight | 61 | 61 | 64 | 64 |
| Stability | Excellent No solids at −30°F. 6 months | Deposits solids after 2 months at −30°F. | Deposits solids after 2 months at −30°F. | Deposits solids after 1 month at −30°F. |

All of the resulting compositions are liquids at room temperature.

EXAMPLE 3

Description of Foaming procedure

The triethanolamine-methylene dianiline-crude methylenedianiline of Example 1 is dissolved in the polyol and then the water, surfactant, catalyst and any other components are added to make a premix. Then the calculated amount of isocyanate is added to the premix, the mixture is agitated at high speed and poured into a 15 × 15 × 2 inch mold preheated to 130°F. The mold is then covered, the mixture is allowed to foam and set for 5 minutes and then is placed into an oven and is heated at 130°F for 15 minutes. The foam is demolded after 15 minutes, crushed and then is allowed to age at room temperature for at least one week prior to testing.

Listed in the following examples are data which summarize the utility of the curing agent with various isocyanates and polyols.

ILD means indentation load deflection which is the force required to deflect the center of the foam to a predetermined percentage of its original thickness.

EXAMPLE 4

COLD MOLDED FOAM MADE WITH NACCONATE 80

The procedure of Example 3 is followed.

| COMPONENTS | A | B |
|---|---|---|
| Pluracol 443[1] | 100 | — |
| Pluracol 380[2] | — | 100 |
| Curing Agent made in Example 1 | 5.0 | 3.6 |
| Water | 2.7 | 2.7 |
| Silicone Y-6454[3] | 1.0 | 1.0 |
| Accure C[4] | 0.8 | 0.8 |
| Pb Naphthenate | 0.05 | 0.05 |
| Nacconate 80[5] | 40.5 | 37.0 |

The resulting foam has the following properties:

| | | |
|---|---|---|
| Density, lbs/cu. ft. | 2.9 | 2.9 |
| Tensile Strength, psi | 23.2 | 18.7 |
| Elongation, % | 120 | 140 |
| Tear Strength, lbs/in. | 1.9 | 2.2 |
| ILD at 25%, lbs. | 32 | 27 |
| ILD at 65%, lbs. | 93 | 76 |
| Sag Factor | 2.9 | 2.8 |
| ILD at 25%, Return | 27 | 23 |
| % Return | 85 | 85 |
| Rebound, % | 59 | 60 |
| Compression Set at 90%, % | 9 | 13 |
| Compression Set at 50%, Humid Aged | 32 | 29 |

1. A 4,800 molecular weight triol initiated polyether polyol having a hydroxy number of 35, a viscosity of about 500 cps at 25°C., less than 0.05% water and at least 50% primary hydroxy groups; sold by BASF-Wyandotte Corporation. Pluracol is a trademark of BASF-Wyandotte Corporation.
2. A 6,500 molecular weight triol initiated polyether polyol having a hydroxy number of 25, a viscosity of 1400 cps at 25°C., about 0.09% unsaturation, less than 0.05% water and at least 50% of the hydroxy groups in the compound being primary hydroxy groups; sold by BASF-Wyandotte Corporation.
3. Organosilicone bock copolymer sold by Union Carbide Corporation. Y6454 is a trademark of Union Carbide Corporation.
4. Tertiary amine blend catalyst mixed with alkylate detergent.
5. 2,4-toluene diisocyanate 80%, 2,6-toluene diisocyanate 20%; sold by Allied Chemical Corporation. Allied Chemical Corporation.

EXAMPLE 5

Curing agent compositions 5, 6, 7, 8 and 9 are prepared in accordance with the invention by blending components as listed in Table II. Percentages are by weight of curing agent.

TABLE II

| Curing agent | 5 | 6 | 7 | 8 | 9 |
|---|---|---|---|---|---|
| Component: | | | | | |
| Triethanolamine, wt. percent | 60 | 70 | 60 | 70 | 60 |
| Methylenedianiline, wt. percent | 35 | 20 | | | 20 |
| 1,5 naphthalene diamine, wt. percent | | | 30 | 20 | |
| Crude methylene dianiline, wt. percent [1] | 5 | | | 10 | 20 |
| Mixed isomers—toluene diamine, wt. percent [2] | | 10 | | | |
| Crude methylene bis (chloroaniline), wt. percent [3] | | | 10 | | |

[1] A reaction product of aniline and formaldehyde containing about 40% of mixed isomers of methylene dianiline, about 20% of mixed isomers of

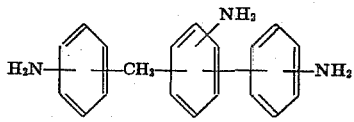

and the balance being mixed isomers of compounds containing more than three aromatic rings and —NH₂ groups.

[2] A mixed product containing about 78% 2,4 toluene diamine, about 19% 2,6 toluene diamine, about 3% of 2,3 toluene diamine and the balance being products having more than one aromatic ring and more than two —NH₂ groups.

[3] A mixed product containing about 45% of mixed isomers of

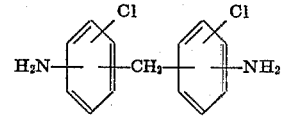

The curing agents prepared in accordance with this example are found to be liquid at room temperature and are stable at temperatures of −10°F for at least 3 months.

EXAMPLE 6

The procedure of Example 4 is followed using the curing agents which are prepared in accordance with Example 5. All curing agents are found to produce polyurethane foams having satisfactory physical properties.

I claim:

1. A process for manufacturing polyurethane foam comprising:
   a. blending with a polyol selected from a polyalkylene ether tetrol, polyalkylene ether triol, polyalkylene ether diol or mixtures thereof, said polyol having a number average molecular weight between about 3,000 and 7,500 and a hydroxy number between about 25 and 100; from about 2 to about 10 percent by weight of polyol of a curing agent composition comprising from about 60 to about 70 weight percent triethanolamine, from about 20 to about 40 weight percent aromatic diamine wherein each amine group is attached to a different carbon atom of of the same or different hydrocarbon aromatic ring which aromatic diamine may also contain on the aromatic ring halogen or lower alkyl substituents and from about 5 to about 20 weight percent of a mixture of at least two compounds each having the general formula:

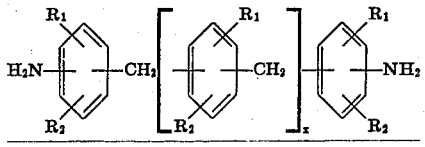

wherein $R_1$ is independently at each occurrence in each compound H, halogen, lower alkyl, or amino; $R_2$ is independently at each occurrence in each compound H, halogen, lower alkyl or amino; and $x$ is 0 or an integer of 1 to 15 provided that if one of said components in said mixture is said aromatic diamine it is in addition to the above defined weight percent of aromatic diamine and said mixture comprises at least 40 percent by weight of two compounds having the above general formula other than said aromatic diamine; from about 1 to about 10 percent of a blowing agent based on weight of polyol; from about 0.4 to about 2.5 percent by weight of polyol of a promoter; and sufficient organic polyisocyanate to provide from about 0.9 to 1.2 isocyanate groups for each hydroxy group present in the polyol and in the water; and b. heating the resulting blend to from about 110°F. to about 300°F. until a cured polyurethane foam is formed.

2. The process of claim 1 wherein said promoter is a tertiary amine catalyst.

3. The process of claim 2 wherein said blowing agent is water.

4. The process of claim 3 wherein said blend is formed using an agitator operated at a speed of from about 1,700 to about 5,000 rpm.

5. The process of claim 3 wherein the formed foam is crushed with a press, released by the press and then allowed to cure for at least 24 hours.

6. The process of claim 3 wherein said mixture is a composition comprising about 35 to about 50 percent by weight of mixture of:

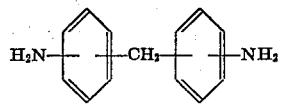

about 15 to 24 percent of:

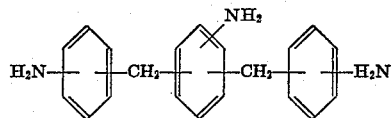

about 10–20 percent of:

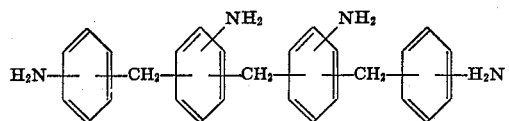

and the balance being:

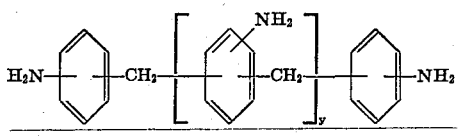

where $y$ is 3 to 15.

* * * * *